(12) United States Patent
Strzelczyk

(10) Patent No.: US 7,121,631 B2
(45) Date of Patent: Oct. 17, 2006

(54) SPINNER HUB ASSEMBLY

(76) Inventor: Justin C. Strzelczyk, 209 Bernice St., Pittsburgh, PA (US) 15237

( * ) Notice: Subject to any disclaimer, the term of this patent is extended or adjusted under 35 U.S.C. 154(b) by 0 days.

(21) Appl. No.: 10/795,669

(22) Filed: Mar. 8, 2004

(65) Prior Publication Data

US 2005/0194833 A1 Sep. 8, 2005

(51) Int. Cl.
B60B 7/04 (2006.01)
B60B 7/00 (2006.01)
(52) U.S. Cl. ............................... 301/37.25; 301/37.108
(58) Field of Classification Search ........... 301/37.101, 301/37.25, 37.102, 37.34, 37.108, 37.109, 301/37.372, 37.376, 108.1–108.3, 37.26–37.28, 301/37.42; 40/587; 362/500
See application file for complete search history.

(56) References Cited

U.S. PATENT DOCUMENTS

| | | | |
|---|---|---|---|
| 1,739,577 A * | 12/1929 | Cantu ........................... 40/587 |
| 2,151,485 A * | 3/1939 | Pawsat ..................... 301/108.1 |
| 2,548,070 A | 4/1951 | Ryan |
| 2,754,154 A * | 7/1956 | Solow ........................... 40/587 |
| 3,528,705 A * | 9/1970 | Oldroyd .................. 301/37.42 |
| 4,818,032 A * | 4/1989 | Thomas .................... 301/37.21 |
| 5,016,944 A | 5/1991 | Schultz |
| 5,190,354 A | 3/1993 | Levy et al. |
| 5,290,094 A | 3/1994 | Gragg |
| 5,316,376 A * | 5/1994 | Defreitas .................. 301/37.26 |
| 5,490,342 A | 2/1996 | Rutterman et al. |
| 5,584,537 A | 12/1996 | Miansian |
| 5,588,715 A | 12/1996 | Harlen |
| 5,659,989 A | 8/1997 | Hsiao et al. |
| 5,957,542 A | 9/1999 | Boothe et al. |
| 6,120,104 A | 9/2000 | Okamoto et al. |
| 6,443,529 B1 | 9/2002 | Williams |
| 6,517,167 B1 * | 2/2003 | Baker ....................... 301/37.25 |
| 6,536,848 B1 * | 3/2003 | Goodman ................ 301/37.25 |
| 6,554,370 B1 | 4/2003 | Fowlkes |
| 6,663,187 B1 * | 12/2003 | Fitzgerald ................ 301/37.25 |
| 2005/0035651 A1 * | 2/2005 | Hsiao ....................... 301/37.25 |
| 2005/0062339 A1 * | 3/2005 | Fitzgerald ................ 301/108.1 |

* cited by examiner

Primary Examiner—Jason R. Bellinger
(74) Attorney, Agent, or Firm—The Webb Law Firm

(57) ABSTRACT

A spinner hub assembly for attachment to a rim of a vehicle tire. The spinner hub assembly includes a rim attachment plate that can be removably attached in a substantially central area of the rim of the vehicle tire. The spinner hub assembly also includes a housing element with a rear housing surface connected to a front housing surface that defines an interior cavity, and the housing element is rotatably attached to the rim attachment plate, such that the housing element rotates independently of the rim of the vehicle tire. The front housing surface of the housing element includes indicia in the form of cut-out portions extending through at least a portion of the front housing surface, such that the interior cavity of the housing element is visible through the cut-out portions.

17 Claims, 3 Drawing Sheets

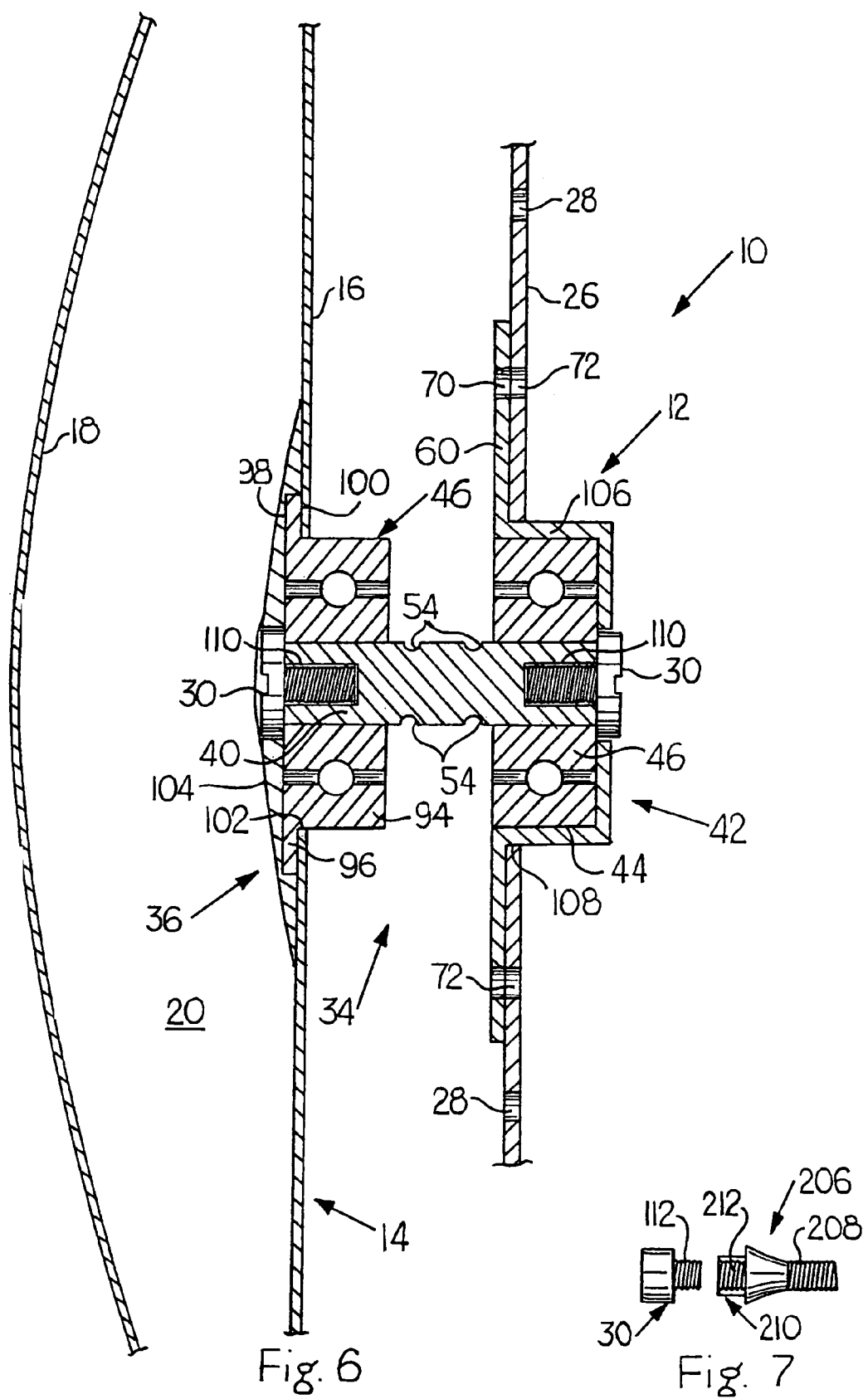

SPINNER HUB ASSEMBLY

BACKGROUND OF THE INVENTION

1. Field of the Invention

The present invention relates generally to aesthetic and mechanical decorations and modifications to vehicles and, in particular, to wheel spinners, spinner hubs and other similar assemblies that are used on or in connection with a tire of a vehicle for decorative and other purposes.

2. Description of Related Art

Vehicle modification and, in particular, car modification, is an ever increasing market that cuts across many age groups and demographics. For example, it is popular among many groups to modify and show his or her car in order to gain acclamation or increase respect among peers. In addition, many sports cars or racing cars are customized by their owners. These customizations include lighting on the runner rails, decorative paint jobs, racing stripes or other applications, decorative spinner nuts and wheel spinners or spinner hubs for placement over vehicle tires.

With respect to a wheel spinner assembly or spinner hub assembly, such assemblies are attached, typically centrally, to a vehicle tire and may spin either with the tire or independently from the tire. Typical wheel spinners include some base or frame that either covers the rim of the tire and rotates therewith or, alternatively, rotates independently of the tire. On this base or frame, decorations, slogans, words, etc., may be placed to either increase the aesthetic value of the car or to advertise or otherwise provide a message to other drivers. To the extent that the base or frame rotates independently of the tire or rim, the prior art also teaches or suggests placing a weight on an outer perimeter of the backside of the base or frame, which is typically a circular element, in order to correctly orient the base in a horizontal or vertical direction. Such assemblies are known in the art and may be found in one or more of the following patents: U.S. Pat. No. 6,554,370 to Fowlkes; U.S. Pat. No. 5,659,989 to Hsiao et al.; U.S. Pat. No. 5,588,715 to Harlen; U.S. Pat. No. 6,443,529 to Williams; U.S. Pat. No. 6,120,104 to Okamoto et al.; U.S. Pat. No. 5,957,542 to Boothe et al.; U.S. Pat. No. 5,490,342 to Rutterman et al.; U.S. Pat. No. 5,290,094 to Gragg; U.S. Pat. No. 5,016,944 to Schultz; U.S. Pat. No. 5,190,354 to Levy et al.; and U.S. Pat. No. 5,584,537 to Miansian.

While such assemblies are known in the art, there is room for additional improvement in both the mechanical connection between the wheel spinner and the rim of the vehicle, as well as in the aesthetic and decorative natures and qualities of the assembly. As these assemblies are typically added to a vehicle not to improve performance, but to improve "the look" of the vehicle, there remains a need for further unique wheel spinners and spinner hub assemblies that are unique and allow the owner's vehicle to be set apart from the others.

SUMMARY OF THE INVENTION

It is, therefore, an object of the present invention to provide a spinner hub assembly that overcomes the deficiencies of the prior art. It is another object of the present invention to provide a spinner hub assembly that is attachable to a rim of a vehicle and is capable of independent rotation with respect to the tire of the vehicle. It is yet another object of the present invention to provide a spinner hub assembly that has a unique and additional aesthetic quality or feature with respect to the prior art assembly. It is a still further object of the present invention to provide a spinner hub assembly that is easy to install and remove and may be replaceable or interchangeable.

Accordingly, the present invention is directed to a spinner hub assembly for attachment to a rim of a vehicle tire. The spinner hub assembly includes a hub attachment plate that is removably attachable in a substantially central area of the rim of the vehicle tire. The assembly also includes a housing element with a rear housing surface connected to a front housing surface, thereby defining an interior cavity. The housing element is rotatably attachable to the hub attachment plate, such that the housing element rotates independently of the rim of the vehicle wheel. The front housing surface of the housing element includes indicia in the form of cut-out portions extending through at least a portion of the front housing surface, such that the interior cavity of the housing element is visible through the cut-out portions.

In a preferred embodiment, the housing element is attached to the hub attachment plate via a bearing assembly. In particular, the bearing assembly includes a first bearing element having a housing element attachment plate with a shaft extending therefrom, and the housing element attachment plate is removably attachable to the rear housing surface of the housing element. The second bearing element is attached to the hub attachment plate and includes a bearing cavity with a bearing element attached therein, and the bearing element has a bearing element cavity. The shaft of the first bearing element extends at least partially through the bearing element cavity.

In another preferred and non-limiting embodiment, either the rear housing surface or the front housing surface of the housing element can be a flat element, a projecting element, a dome-shaped element and/or a raised element. Further, the indicia may be a letter, a number, a symbol, text, a term, a phrase, a word, a design and a representation. In another embodiment, a weight element may be attached to either the rear housing surface and/or the front housing surface, such that the housing element is biased to a predetermined and oriented position. Also, a light mechanism may be positioned within the internal cavity of the housing element, such that, in operation, light emanates from the cut-out portions of the housing element.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 6 is a side sectional view of a further embodiment of a spinner hub assembly according to the present invention; and FIG. 7 is a side sectional view of an attachment mechanism according to the present invention.

DESCRIPTION OF THE PREFERRED EMBODIMENTS

Figure 1:
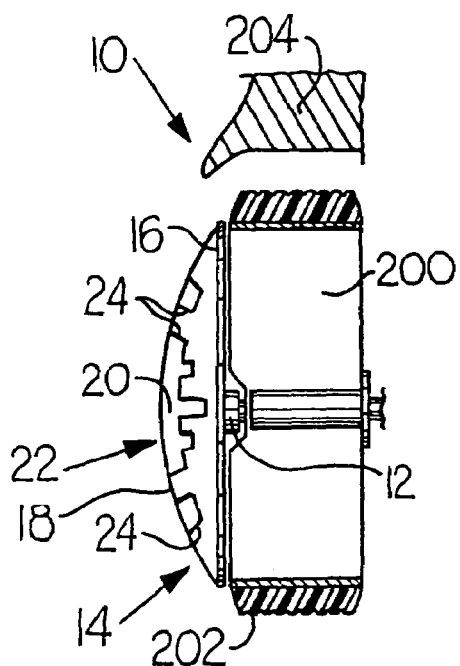
FIG. 1 is a schematic view of a spinner hub assembly according to the present invention attached to a hub of a wheel of a vehicle.
Figure 2:
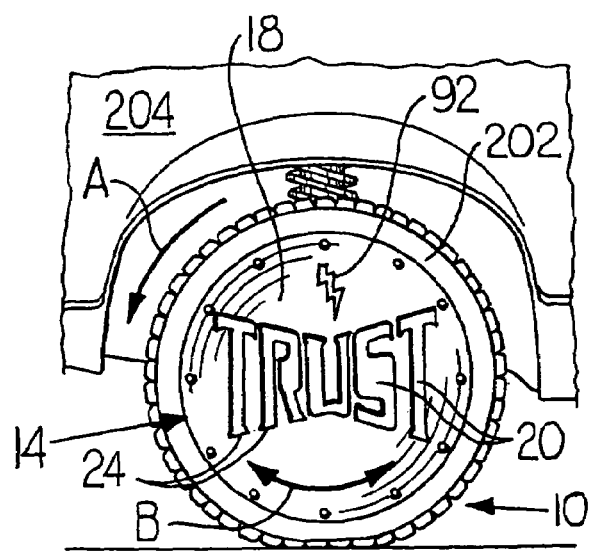
FIG. 2 is a front view of a spinner hub assembly according to the present invention attached to a rim of a wheel of a vehicle.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 3:
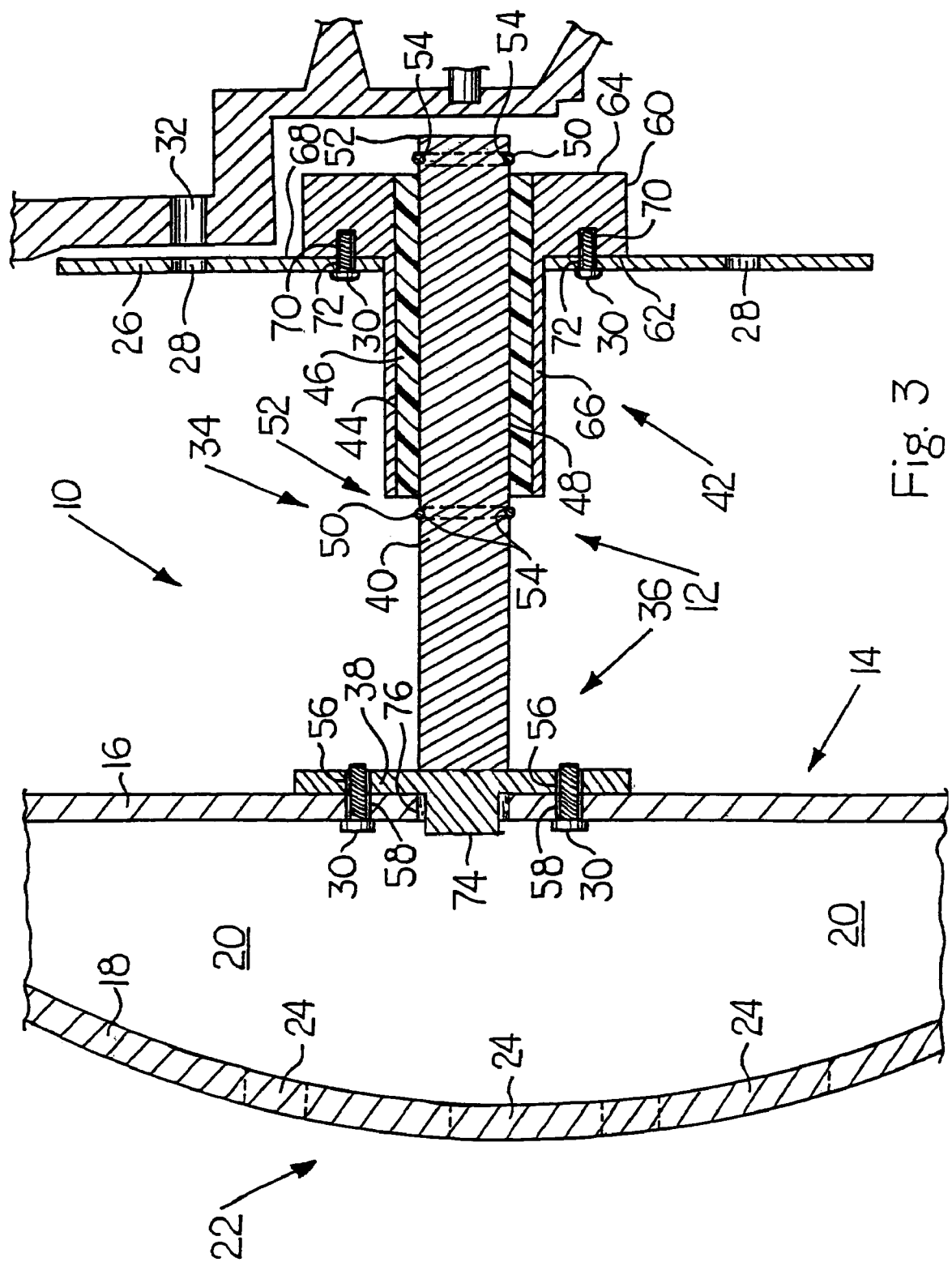
FIG. 3 is a side sectional view of a spinner hub assembly according to the present invention.

The present invention is directed to a spinner hub assembly 10, which is illustrated in various views and embodiments in FIGS. 1–6. The spinner hub assembly 10 is configured to attach to a hub 200 of a wheel 202 on a vehicle 204. While the spinner hub assembly 10, as discussed hereinafter, is equally useful in connection with any type of vehicle, e.g., a car, a truck, a motorcycle, etc., the spinner hub assembly 10 is typically used in connection with cars, e.g., sports cars, modified cars and the like. As best seen in FIGS. 1 and 3, the spinner hub assembly 10 includes a hub attachment plate 12 that is removably attachable in a substantially central area of the hub 200 of the wheel 202. In order to effect proper rotation, the hub attachment plate 12 is not only attached in a central area of the hub 200, but is spaced radially so as not to wobble or otherwise affect the attachment area. In a preferred embodiment, the hub attachment plate 12 is a substantially circular element attached centrally to the hub 200.

The spinner hub assembly 10 also includes a housing element 14 including a rear housing surface 16 connected to a front housing surface 18. Further, the connection between the rear housing surface 16 and the front housing surface 18 defines an interior cavity 20 within the housing element 14. The housing element 14 is rotatably attached to the hub attachment plate 12, such that the housing element 14 rotates independently of the 200 of the tife wheel 202. Still further, the front housing surface 18 of the housing element 14 includes indicia 22. The indicia 22 takes the form of cut-out portions 24 that extend through at least a portion of the front housing surface 18. Accordingly, the interior cavity 20 of the housing element 14 is visible through these cut-out portions 24. Such an assembly is illustrated in schematic form in FIG. 1. Further, due to the rotational attachment between housing element 14 and the attachment plate 12, even while the hub 200 and wheel 202 of the vehicle 204 is rotating in the direction of arrow A, the housing element 14 is free to rotate independently of and in either direction with respect to the wheel 202 of the vehicle 204, as indicated by arrow B.

In a preferred and non-limiting embodiment, the hub attachment plate 12 includes a circular disk element 26 including at least one, and typically multiple, attachment orifices 28 extending therethrough. See FIG. 3. An attachment element 30 is positioned through an attachment orifice 28 and further through an attachment orifice 32 on the hub 200 of the wheel 202. In this manner, the circular disk element 26 is removably attached to the In a preferred embodiment, multiple spaced attachment orifices 28 (and corresponding attachment orifices 32) are positioned concentrically around a center point of the circular disk element 26 (and consequently the hub 200). It should be noted that many vehicles have standard and spaced attachment orifices 32 already located on the hub 200. Therefore, it is preferable to match the pattern of the attachment orifices 32 of the huh 200 with corresponding attachment orifices 28 of the circular disk element 26. In addition, the attachment element 30 may be a screw arrangement, a bolt arrangement, etc. The circular disk element 26 is preferably removably attached to the hub 200, such that the spinner hub assembly 10 can be removed from the hub 200 for a variety of reasons, including repair, modification or simple removal.

In order to effect rotation of the housing element 14 with respect to the hub 200, the housing element 14 maybe rotatably attached to the hud attachment plate 12 via a bearing assembly 34. In a preferred and non-limiting embodiment, the bearing assembly 34 includes a first bearing element 36 having a housing element attachment plate 38 with a shaft 40 extending therefrom. The housing element attachment plate 38 is removably attachable to the rear housing surface 16 of the housing element 14. In addition, in this embodiment, the bearing assembly 34 includes a second bearing element 42 attached to the hub attachment plate 12. The second bearing element 42 includes a bearing element cavity 44 with a bearing 46 positioned or attached therein. The bearing 46 further includes a bearing cavity 48. The shaft 40 of the first bearing element 36 extends at least partially through the bearing cavity 48. In this manner, the first bearing element 36 and the second bearing element 42 are rotatable with respect to each other in either direction.

In a further embodiment, the bearing assembly 34 includes one or more clips 50 that are sized and shaped so as to engage at least a portion of the shaft 40 and preferably positioned adjacent an end 52 of the second bearing element 42. When installed, these clips 50 will ensure that the shaft 40 is secured within the bearing element cavity 44, thus preventing lateral ejection. In order to further secure the shaft 40 with respect to the second bearing element 42, the shaft 40 may also include one or more groove portions 54 that are positioned on the shaft 40 and sized and shaped so as to at least partially accept a portion of the clip 50. Again, preferably, the groove portions 54 would be placed on the shaft 40 adjacent or near either end 52 of the second bearing element 42. The clip 50 may be ratcheted to the shaft 40 or attached within the groove portions 54 via a friction fit, such as by a C-clip as is known in the art.

The housing element attachment plate 38 includes at least one and typically multiple attachment orifices 56 extending therethrough. An attachment element 30 is positioned through the attachment orifice 56 and further through a corresponding attachment orifice 58 positioned on and extending through the rear housing surface 16. In this manner, the housing element 14 is removably attached to the housing element attachment plate 38. As discussed above in connection with the circular disk element 26, in a preferred and non-limiting embodiment, multiple and spaced attachment orifices 56 are positioned concentrically around a center point of the housing element attachment plate 38. Further, the attachment element 30, as discussed above, may be a screw arrangement, a bolt arrangement, etc., which provides for removable attachment of the components.

Figure 4:
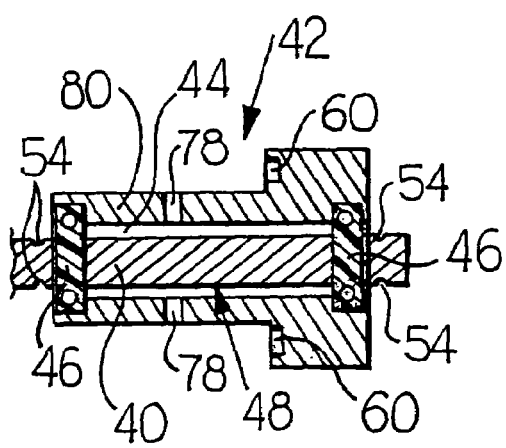
FIG. 4 is a side sectional view of an alternate embodiment of a second bearing element of a spinner hub assembly according to the present invention.
Figure 5:
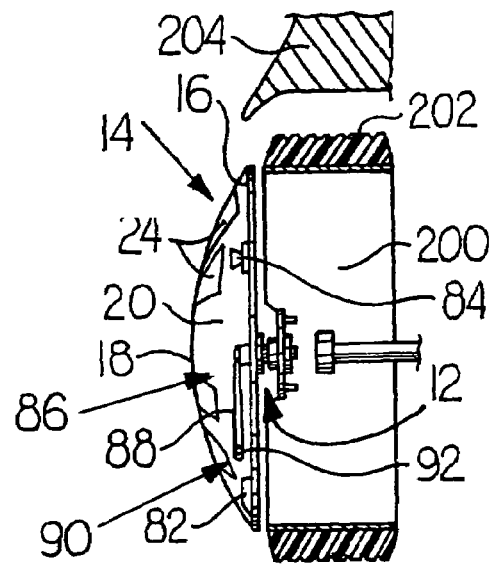
FIG. 5 is a side view of a further embodiment of a spinner hub assembly according to the present invention attached to a hub of a wheel of a vehicle.

As seen in FIGS. 3 and 4, the second bearing element 42 includes a flange portion 60 having a first surface 62 on a second surface 64. Further, in this embodiment, the second bearing element 42 includes a second bearing element shaft 66 extending through the hub attachment plate 12. Accordingly, the first surface 62 of the flange portion 60 is removably attached to and abuts a rear surface 68 of the hub attachment plate 12. In addition, the flange portion 60 includes one or more attachment orifices 70 extending therethrough. Again, the attachment element 30 is positionable through an attachment orifice 70, and further through a corresponding attachment orifice 72 on the hub attachment plate 12. Accordingly, the flange portion 60 allows the second bearing element 42 to be removably attached to the hub attachment plate 12. Again, the attachment orifices 70 of the flange portion 60 may be spaced and positioned concentrically around the center point of the flange portion 60 of the second bearing element 42. The corresponding attachment orifices 72 on the hub attachment plate 12 would include the same pattern.

In order to allow attachment of the housing element 14, the housing element attachment plate 38 includes a projecting guide surface 74. This projecting guide surface is sized and shaped so that it can mate with a corresponding guide orifice 76 that extends through the rear housing surface 16 of the housing element 14. Due to the circular nature of these components, it is important to properly align the housing element 14 with respect to the hub 200 of the wheel 202. If the spinner hub assembly 10 is off-center, the spinner hub assembly 10 would start to wobble and eventually fail. The projecting guide surface 74 allows the user to appropriately place the rear housing surface 16 in a requisite position with respect to the housing element attachment plate 38, where the center points are substantially aligned. The guide orifice 76 is therefore located in a substantially central location on the rear housing surface 16 and is circular. The projecting guide surface 74 may be in the form of a continuous projection, a rim or lip, etc.

In a further embodiment, the second bearing element 42 includes one or more passageways 78 that extend through a wall 80 of the second bearing element 42. These passageways 78 connect the bearing element cavity 44 with an area outside of the second bearing element 42. These passageways provide air to the bearing element cavity 44 to prevent compression, overheating and other adverse reactions in the cavity from the continued rotation of the housing element 14 with respect to the hub attachment plate 12 and hub 200 of the wheel 202.

Both the rear housing surface 16 and the front housing surface 18 of the housing element 14 may be formed in many different shapes. For example, the rear housing surface 16 and/or the front housing surface 18 may be in the form of a flat element, a projecting element, a dome-shaped element or a raised element. In a preferred and non-limiting embodiment, the rear housing surface 16 is a substantially flat circular plate, while the front housing surface 18 is a domed or dome-shaped surface, which thereby defines the interior cavity 20. However, the rear housing surface 16 may be a dome-shaped element, with the front housing surface 18 a flat plate, which still defines an interior cavity 20. The indicia 22 may take many forms. For example, the indicia 22 can be a letter, a number, a symbol, text, a term, a phrase, a word, a design, a representation, etc.

In a further embodiment, the spinner hub assembly 10 may include a light mechanism 84 positioned within the interior cavity 20 of the housing element 14. In operation, light would emanate from the light mechanism 84 and project through the cut-out portions 24 of the housing element 14. This would provide an additional and aesthetic feature to the spinner hub assembly 10 for nighttime driving. The light mechanism 84 may project light of many and varying colors, a strobe light or some other flashing or variant light source. In addition, it is envisioned that the light mechanism 84 may include a miniature generator or otherwise harness and retain the power generated from the rotating wheel 202 on the vehicle 204. Accordingly, when the wheel 202 on the vehicle 204 is rotating, this rotation and force may be used to generate power in some storage device in operative communication with the light mechanism 84, such that the light mechanism 84 begins to project light when the vehicle 204 is moving.

In yet another preferred and non-limiting embodiment, the spinner hub assembly 10 includes a housing interior element 86 positioned within the interior cavity 20 of the housing element 14. The housing interior element 86 can be a tab, a projection, a ball, and may take a variety of shapes and sizes. In a preferred embodiment, the housing interior element 86 is positioned within the interior cavity 20 of the housing element 14 such that it is at least partially visible through at least one of the cut-out portions 24 on the front housing surface 18. Accordingly, the housing interior element 86 provides an additional aesthetic benefit to the spinner hub assembly 10, as the housing interior element 86 is visible through the cut-out portions 24. Further, the housing interior element 86 may rotate along with or independently of either the housing element 14 or the hub 200 of the wheel 202. For example, the housing interior element 86 may be attached to a further bearing assembly that is in operative communication with the bearing assembly 34 or some independent assembly allowing the element 86 to rotate within the interior cavity 20. Again, this adds an aesthetic benefit to the spinner hub assembly 10, as the housing interior element 86 would be spinning and visible through the cut-out portions 24 on the front housing surface 18.

Still further, the housing interior element 86 may include a front surface 88 with some indicia 90 positioned thereon. Unlike the indicia 22 used in connection with the front housing surface 18, the indicia 90 used on the front surface 88 of the housing interior element 86 may be in the form of either an application, a cut-out portion or any other indicia as is known in the art. For example, the indicia 90 may be a letter, a number, a symbol, text, a term, a phrase, a word, a design, a representation, etc. In one embodiment, the cut-out portions 24 on the front housing surface 18 may take the form or represent a playing or game board, while the housing interior element 86 may take the form of a game piece that either rotates or is static with respect to the rotation of the housing element 14. Since the housing interior element 86 is visible through the cut-out portions 24, the housing interior element 86, together with the cut-out portions 24, provides interacting pieces and components of a game.

In yet another preferred and non-limiting embodiment, the spinner hub assembly 10 includes some application indicia 92 that is directly applied, such as in the form of a sticker, paint, etching, etc., to the front housing surface 18 andlor front surface 88 of the housing interior element 86. As with the example wherein the front housing surface 18 and housing interior element 86 take the form of a game, the cut-out portions 24 may be in the form of a roulette wheel. Application indicia 92 may be placed on or near the cut-out portions 24 to indicate numbers, colors, etc., as is known in connection with a game of roulette. Next, the housing interior element 86 would include indicia 90 thereon, possibly taking the form of a ball located on the end of a tab or in the form of the application indicia 92 that would represent a ball. As the hub 200 rotates, not only does the housing element 14 rotate, but the housing interior element 86 is also configured to rotate independently thereof. Therefore, the ball is visible through the cut-out portions 24, and when the vehicle 204 comes to a stop, the ball or indicia 90 on the housing interior element 86 would be finally visible through a specific and indicated cut-out portion 24 on the front housing surface 18. This would indicate a winner in a game of roulette.

Many games and other interacting systems can be formed by using one or more housing interior elements 86 connected, whether rotating or not, within the interior cavity 20 of the housing element 14. Therefore, a game system could be developed and operated using the rotation of the hub 200 and wheel 202 of the vehicle 204. Any number of games, interacting systems and other orientations is envisioned.

It is also envisioned that the front housing surface 18 is removable by the user from the rear housing surface 16. This would allow the user to purchase multiple different front housing surfaces 18 having various indicia 22, cut-out portions 24 or application indicia 92 thereon. As the front housing surface 18 would fit any of the rear housing surfaces 16 located on any of the wheel 202 of the vehicle 204, the front housing surfaces 18 would provide an interchangeable system that is operable by the user. For example, the rear housing surface 16 may include some removable lip or other engagement mechanism that can be removed or interacted with by a user.

A further preferred and non-limiting embodiment is illustrated in FIG. 6. As discussed above, the bearing assembly 34 includes the first bearing element 36 and the second bearing element 42. However, in this embodiment, the first bearing element 36 includes a bearing 46 having a bearing cavity 48. The second bearing element 42 is attached to the hub attachment plate 12 and also has a bearing element cavity 44 with the further bearing 46 attached therein, and this bearing 46 also includes a bearing cavity 48. The shaft 40 extends through the bearing cavity 48 of the bearing 46 of the first bearing element 36, as well as the bearing cavity 48 of the bearing 46 of the second bearing element 42.

In this embodiment, the bearing 46 of the first bearing element 36 includes a body portion 94 and a flange portion 96, and the flange portion 96 includes a first surface 98 and a second surface 100. The second surface 100 of the flange portion 96 abuts the rear housing surface 16, and the body portion 94 extends through a bearing orifice 102 extending through and positioned on the rear housing surface 16. In this manner, the first bearing element 36 is attached to the rear housing surface 16. In order to hide or obscure the first surface 98 of the flange portion 96, a bearing element cover 104 covers the first surface 98 of the flanae portion 96. It is envisioned that the bearing element cover 104 may also include any of the indicia 90 discussed above. Further, this bearing element cover 104 may preferably be dome-shaped, as illustrated in FIG. 6.

In this embodiment, the second bearing element 42 includes the flange portion 60 with a flanae portion first surface 62 and a flange portion second surface 64. The second surface 64 abuts a surface of the hub attachment plate 12, as discussed above. However, in this embodiment, a bearing element cavity wall 106 extends through a bearing orifice 108 extending through and positioned on the hub attachment plate 12. In this manner, the second bearing element 42 is attached to the hub attachment plate 12.

An attachment orifice 110 is positioned on each end of the shaft 40. This attachment orifice 110 is configured to receive an attachment element 30 and serves to secure the shaft 40 within the bearing cavity 48 of each respective bearing 46. As discussed above, the attachment element 30 may be a screw arrangement, a bolt arrangement, etc. In order to further secure the shaft 40, the bearing assembly 34 of this embodiment also may include one or more clips 50 capable of engaging a portion of the shaft 40 and positioned adjacent an end of the first bearing element 36 and/or the second bearing element 42. In this manner, the shaft 40 is further secured within the bearing cavity 48 and prevented from laterally ejecting. Further, the shaft 40 may include one or more groove portions 54 positioned on the shaft 40 for accepting a portion of a clip 50. The above-discussed embodiment separates the bearing 46 of the first bearing element 36 and the bearing 46 of the second bearing element 42. In this manner, even further independent rotation between the hub attachment plate 12 and the housing element 14 is achieved.

The hub attachment plate 12 may be attached to the hub 200 of the wheel 202 by means known in the art. For example, and as illustrated in FIG. 7, the normal lug bolt 206 used to attach the hub 200 to the vehicle 204 may be modified. Specifically, the lug 206 may include a threaded end 208 and an engagement end 210. Further, on the engagement end 210 of the lug-bolt 206, a threaded cavity 212 is positioned therein. Accordingly, the attachment element 30 includes a threaded portion 112 that mates with the threaded cavity 212 on the engagement end 210 of the lug-bolt 206. Therefore, once the threaded end 208 of the lug-bolt 206 is attached to the hub 200 of the vehicle 204, the hub attachment plate 12 may be attached to the hub 200 through an attachment element 30 threadedly connected to the lug 206. In this manner, the spinner hub assembly 10 is attached to the hub 200 of the vehicle 204. Other further means for attaching the spinner hub assembly 10 to the hub 200 are envisioned as is known in the art.

In this manner, the present invention provides a spinner hub assembly 10 that provides additional aesthetic benefits over the wheel spinners and hub assemblies of the prior art. The present invention provides a spinner hub assembly 10 that is securable to a hub 200 and rotates independently of the hub 200. The cut-out portions 24 provide an added aesthetic benefit and may be used in conjunction with various other mechanisms, including a light mechanism 84, a housing interior element 86, etc.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A spinner hub assembly configured for attachment to a hub of a vehicle wheel, the spinner hub assembly comprising:
   a hub attachment plate configured to be removably attached in a substantially central area of the hub of the vehicle wheel;
   a housing element having a rear housing surface connected to a front housing surface, thereby defining an interior cavity; and
   a bearing assembly rotatably attaching the housing element to the hub attachment plate, whereby the housing element rotates independently of the hub of the vehicle wheel;
   wherein the front housing surface of the housing element includes indicia in the form of cut-out portions extending through at least a portion of the front housing surface, such that the interior cavity of the housing element is visible through the cut-out portions;

wherein the bearing assembly includes a first bearing element having a housing element attachment plate with a shaft extending therefrom and a second bearing element attached to the hub attachment plate and having a bearing element cavity with a bearing positioned therein, the bearing having a bearing cavity, and the shaft of the first bearing element extending at least partially through the bearing element cavity and the bearing cavity; and wherein the second bearing element includes a flange portion with a first surface and a second surface and a second bearing element shaft extending through the hub attachment plate, wherein the first surface of the flange portion is configured to be removably attached to and abut a rear surface of the hub attachment plate.

2. The assembly of claim 1, wherein the hub attachment plate comprises a circular disk element having at least one attachment orifice extending therethrough, wherein an attachment element is positioned through the attachment orifice and through a corresponding attachment orifice on the hub of the vehicle wheel, thereby removably attaching the circular disk element to the hub.

3. The assembly of claim 2, further comprising a plurality of spaced attachment orifices positioned concentrically around a center point of the circular disk element.

4. The assembly of claim 3, wherein the attachment element is at least one of a screw arrangement and a bolt arrangement.

5. The assembly of claim 1, wherein the housing element attachment plate is configured to be removably attached to the rear housing surface of the housing element.

6. The assembly of claim 1, wherein the bearing assembly further comprises at least one clip configured to engage at least a portion of the shaft and positioned adjacent at least one end of the second bearing element, such that the shaft is secured within the bearing element cavity and prevented from lateral ejection.

7. The assembly of claim 6, wherein the shaft includes at least one groove portion positioned on the shaft and configured to at least partially accept a portion of at least one clip.

8. The assembly of claim 1, wherein the housing element attachment plate includes at least one attachment orifice extending therethrough, wherein an attachment element is positioned through the attachment orifice and through a corresponding attachment orifice on the rear housing surface, thereby removably attaching the housing element to the housing element attachment plate.

9. The assembly of claim 8, further comprising a plurality of spaced attachment orifices positioned concentrically around a center point of the housing element attachment plate.

10. The assembly of claim 9, wherein the attachment element is at least one of a screw arrangement and a bolt arrangement.

11. The assembly of claim 1, wherein the flange portion includes at least one attachment orifice extending therethrough, wherein an attachment element is positioned through the attachment orifice and through a corresponding attachment orifice on the hub attachment plate, thereby removably attaching the second bearing element to the hub attachment plate.

12. The assembly of claim 11, further comprising a plurality of spaced attachment orifices positioned concentrically around a center point of the flange portion of the second bearing element.

13. The assembly of claim 12, wherein the attachment element is at least one of a screw arrangement and a bolt arrangement.

14. The assembly of claim 5, wherein the housing element attachment plate includes a projecting guide surface configured to mate with a corresponding guide orifice extending through the rear housing surface of the housing element.

15. The assembly of claim 14, wherein the guide orifice is substantially centrally located on the rear housing surface.

16. The assembly of claim 1, wherein at least one of the rear housing surface and the front housing surface is at least one of a flat element, a projecting element, a dome-shaped element and a raised element.

17. The assembly of claim 1, wherein the indicia is at least one of a letter, a number, a symbol, text, a term, a phrase, a word, a design and a representation.

* * * * *

UNITED STATES PATENT AND TRADEMARK OFFICE
CERTIFICATE OF CORRECTION

PATENT NO.          : 7,121,631 B2
APPLICATION NO. : 10/795669
DATED                   : October 17, 2006
INVENTOR(S)        : Strzelczyk It is certified that error appears in the above-identified patent and that said Letters Patent is hereby corrected as shown below:

Title Page, Item (76) Inventor:
"Justin C. Strzelczyk, 209 Bernice St., Pittsburgh, PA (US) 15237"
should read
-- Justin C. Strzelczyk (Deceased); Legal Representative:
   S&T Bank (Pittsburgh, PA) --

Column 3, Line 45, "of the 200 of the tife wheel 202" should read
--of the hub 200 of the wheel 202 --

Column 3, Line 53, "and the attachment" should read
-- and the hub attachment --

Column 3, Lines 65-66, "to the    In a" should read -- to the hub 200.  In a --

Column 4, Line 6, "of the huh" should read -- of the hub --

Column 4, Line 15, "maybe" should read -- may be --

Column 4, Line 16, "the hud attachment" should read -- the hub attachment --

Column 6, Line 56, "andlor front surface" should read -- and/or front surface --

Column 7, Line 49, "the flanae portion" should read -- the flange portion --

Column 7, Line 55, "a flanae portion" should read -- a flange portion --

Column 8, Line 20, "the lug 206" should read -- the lug-bolt 206 --

UNITED STATES PATENT AND TRADEMARK OFFICE
CERTIFICATE OF CORRECTION

| | |
|---|---|
| PATENT NO. | : 7,121,631 B2 |
| APPLICATION NO. | : 10/795669 |
| DATED | : October 17, 2006 |
| INVENTOR(S) | : Strzelczyk |

It is certified that error appears in the above-identified patent and that said Letters Patent is hereby corrected as shown below:

<u>Column 8</u>, Line 30, "the lug 206" should read -- the lug-bolt 206 --

Signed and Sealed this

Thirteenth Day of March, 2007

JON W. DUDAS
*Director of the United States Patent and Trademark Office*